United States Patent [19]

Miller

[11] Patent Number: 5,350,554
[45] Date of Patent: Sep. 27, 1994

[54] METHOD FOR PRODUCTION OF REINFORCED CEMENTITIOUS PANELS

[75] Inventor: Robert G. Miller, Bakersfield, Calif.

[73] Assignee: Glascrete, Inc., Bakersfield, Calif.

[21] Appl. No.: 93,319

[22] Filed: Jul. 16, 1993

Related U.S. Application Data

[60] Continuation-in-part of Ser. No. 807,256, Dec. 13, 1991, abandoned, which is a division of Ser. No. 728,984, Jul. 12, 1991, abandoned, which is a continuation-in-part of Ser. No. 649,468, Feb. 1, 1991, abandoned.

[51] Int. Cl.$^5$ .......................... B28B 5/00; B28B 7/36; B29C 47/06; B32B 31/30
[52] U.S. Cl. ..................................... 264/171; 156/42; 156/543; 156/549; 264/149; 264/151; 264/160; 264/163; 264/177.11; 264/211.11; 264/212; 264/213; 264/256; 264/258; 264/308; 264/310; 264/337; 264/338; 264/DIG. 57; 264/DIG. 64; 425/101; 425/102; 425/115; 425/223; 425/224; 425/364 R
[58] Field of Search ................ 425/93, 101, 102, 115, 425/122, 223, 224, 364 R; 156/42, 543, 549; 118/108, 123, 126, 207, 239, 405, 413, 419, 428; 264/256, 333, 160, 163, 162, 165, 212, 260, 134, 135, 136, 257, 258, 308, 294, 298, DIG. 57, DIG. 64, 145, 149, 151, 167, 171, 177.11, 211.11, 213, 310, 337, 338

[56] References Cited

U.S. PATENT DOCUMENTS

| | | |
|---|---|---|
| Re. 32,038 | 7/1985 | Clear et al. . |
| 2,446,782 | 8/1948 | Otis et al. . |
| 3,217,375 | 11/1965 | Kinnard . |
| 3,284,980 | 6/1966 | Dinkel . |
| 3,303,245 | 2/1967 | Trudeau . |
| 3,964,944 | 6/1976 | Gwynne . |
| 3,993,822 | 3/1973 | Kanuf et al. . |
| 4,088,808 | 5/1978 | Cornwell et al. . |
| 4,131,670 | 12/1978 | Abate . |
| 4,171,395 | 10/1979 | Tillotson . |
| 4,200,603 | 4/1980 | Raffel et al. . |
| 4,270,889 | 6/1981 | Hoffmann et al. . |
| 4,298,413 | 11/1981 | Teare . |
| 4,364,790 | 5/1982 | Delcoigue . |
| 4,369,025 | 1/1983 | Vonder Weid . |
| 4,411,723 | 10/1983 | Takeuchi . |
| 4,450,022 | 1/1984 | Galer . |
| 4,477,495 | 10/1984 | Ring et al. . |
| 4,488,917 | 12/1984 | Porter et al. . |
| 4,504,335 | 5/1985 | Galer . |
| 4,518,652 | 5/1985 | Willoughby . |
| 4,647,496 | 8/1987 | Lahnert et al. . |
| 4,793,892 | 12/1988 | Miller et al. . |
| 4,810,569 | 4/1989 | Lehnert . |
| 4,816,091 | 2/1989 | Miller . |
| 4,907,531 | 3/1990 | Hussian . |
| 4,916,004 | 4/1990 | Ensminger et al. . |
| 5,030,502 | 11/1991 | Teare . |

FOREIGN PATENT DOCUMENTS

| | | |
|---|---|---|
| 37173 | 10/1981 | European Pat. Off. . |
| 2071454 | 9/1971 | France . |
| 9169805 | 9/1984 | Japan . |
| 59-179306 | 10/1984 | Japan . |

*Primary Examiner*—Karen Aftergut
*Attorney, Agent, or Firm*—Killworth, Gottman, Hagan & Schaeff

[57] ABSTRACT

A method and apparatus for producing light-weight construction panels having a cementitious core layer surfaced with a layer of reinforcing fabric bonded to the two faces of the core includes the use of slurry applicator having a supporting member and a doctor in addition to a moving carrier for the slurry coated fabric. The edges of the panel also are covered with the fabric and may be open mesh edges. Cementitious slurry, for example, portland cement slurry, is applied to the fabric by means of a supporting member over which the fabric is drawn and a doctor means adjustably mounted above the supporting member. The supporting member is of a non-base-reactive material such as polypropylene or stainless steel; the use of such a supporting member permits better application of the slurry to the fabric before placement of the slurry coated fabric on the moving carrier.

6 Claims, 6 Drawing Sheets

METHOD FOR PRODUCTION OF REINFORCED CEMENTITIOUS PANELS

BACKGROUND OF THE INVENTION

This application is a continuation-in-part of application Ser. No. 809,256 filed Dec. 13, 1991, now abandoned, as a division of application Ser. No. 728,984, filed Jul. 12, 1991, now abandoned which in turn is a continuation-in-part of application Ser. No. 649,468 filed Feb. 1, 1991, now abandoned.

This invention relates to the production of fabric-reinforced cementitious panels including gypsum wallboard, lightweight concrete panels, tile backerboards, and the like. In general, such cementitious panels are fastened to the framing of a wall or building exterior or over a sub-floor, to serve as a backerboard for the installation of a facing material such as ceramic tile, thin brick, thin marble panels and stucco. However, they are also used without a hard facing material as with the application of a layer of paint or wallpaper.

More particularly, this invention relates to a novel method and apparatus for producing cementitious backerboards comprising a panel having a core of a lightweight concrete with the faces being reinforced with a layer of fabric bonded thereto. Such cementitious panels are described in U.S. Pat. No. 3,284,980 to P. E. Dinkel, U.S. Pat. No. 4,450,022 to R. E. Galer et al and U.S. Pat. No. 4,916,004 to R. P. Ensminger et al. These panels are nailable and are readily fastened to framing members and the like with nails, screws or other fasteners. Since the panels are of concrete they are substantially unaffected by water and consequently find extensive use in wet areas such as shower enclosures, bathtub surrounds, kitchen areas, and entryways, as well as on building exteriors.

However, my invention is not limited to the production of cementitious backerboards having a core of light-weight concrete. Included within the class of cementitious panels to which my invention pertains are panels having a gypsum core such as the gypsum boards with a fibrous mat face as described in U.S. Pat. No. 4,810,569 to B. G. Randall. Other examples of gypsum wallboards are described in U.S. Pat. No. 4,518,652 to M. D. Willoughby, and U.S. Pat. No. 3,993,822 to A. Knauf.

Cementitious panels are generally produced employing a core mix of water, a cementitious material (e.g., portland cement, magnesia cement, alumina cement, gypsum and blends thereof) and a lightweight aggregate (e.g., expanded clay, expanded slag, expanded shale, perlite, pumice, expanded glass beads and polystyrene beads). The core may also contain foamed gypsum or foamed cement compositions, and may contain no aggregate.

The reinforcing fabric most generally employed is a fiber-glass scrim, in particular, a woven mesh of polyvinylchloride coated glass-fiber yarns. The fabric is bonded to the core by a cementitious slurry, for example, a portland cement slurry, or is bonded by the core mix composition itself extending through the openings in the fabric.

In the present invention the reinforcing fabric is pervious; the openings in the mesh, scrim or other fabric are sufficiently large to permit passage of the fabric bonding material such as a portland cement slurry with or without an aggregate added. Fabrics other than glass-fiber meshes, such as fabrics of synthetic resin fibers, for example, nylon fibers, polyvinylidene chloride fibers and polyester fiber yarns coated with PVC, can be used.

Recently fabric reinforced panels with fabric-wrapped edges have been introduced. U.S. Pat. No. 4,916,004 to R. P. Ensminger et al describes such a cement board with longitudinal edges (as well as the top and bottom surfaces) reinforced with fiber-glass mesh; in this patent the reinforcing mesh is completely embedded in the core material on all surfaces.

Another development has been that of a fabric reinforced cementitious panel with the longitudinal edges wrapped with the fabric, but with the fabric left open along the edges, as described in U.S. Pat. No. 5,030,502 to J. W. Teare.

In each of these two developments the fabric reinforces the longitudinal edges to provide better edge strength. Where a nail or screw is inserted close to the edge of a panel in fastening to the narrow face of a stud or other framing member the fabric minimizes break out of edge and provides more secure attachment of the panel to the framing.

SUMMARY OF THE INVENTION

My invention relates to a novel method and apparatus for applying a cementitious slurry to a moving web of a pervious reinforcing fabric and furthermore for applying slurry in a selected longitudinal section. It has particular application in the production of the wrapped-edge type fabric reinforced panel and most specifically to a wrapped-edge type fabric reinforced panel with the fabric left open along the edges.

In my invention the web of fabric is passed over a supporting member such as a plate or roller, a cementitious slurry is fed to the upper surface of the web and then is spread uniformly over the web in controlled amount by means of a doctor (blade, bar or roller) adjustably spaced from the supporting member or by other means as described herein. The web is drawn out of the slot formed by the doctor and supporting member, thereby applying the desired coating of slurry; the web is then deposited upon the appropriate surface. If it is the first web it is deposited upon the carrier (e.g., a plastic coated paper web or plastic carrier sheet) on which the panels are formed. If it is the second web it is deposited upon the upper face of the core layer.

In the manufacture of these fabric-reinforced panels is essential that the web of the pervious fabric must be adequately coated with the slurry on both the lower and upper surfaces and that the openings in the pervious fabric be filled with the slurry. This is necessary in order to be filled with the slurry and in order to secure adequate bonding of the web to the core layer. Even where the web is properly coated and the openings filled, the amount of slurry carried by the web is very small. In general, all of this light layer slurry is needed in order to obtain good bonding of the web to the core layer. A heavier layer of slurry on the mesh might be required for some purposes but a heavy layer tends to make the panel surface too hard, impairing the nailability of the panel, or makes the panel unduly heavy.

I have discovered that with a supporting member having a non-base-reactive surface, the web of fabric, as it is drawn over the supporting member, is suitably coated with a layer of the slurry in the desired amount. There is little or no tendency for the slurry to cling to such a supporting member and consequently this eliminates the tendency to drag the slurry off the bottom surface of the web. As can be appreciated, where the slurry is wiped off of the surface of the web there will be an inadequate amount of material to effect bonding to the core layer. This is especially true in the case of the top or second web which must be laid down on the core layer.

Cementitious slurries, such as portland slurry, are strongly basic; a portland cement slurry is very alkaline with a pH of at least 11–12, due to the presence of calcium hydroxide. These slurries tend to react with, or have an affinity for, base-reactive surfaces and consequently have a decided tendency to cling to these surfaces. With a supporting member of a base-reactive material the slurry in a large measure is wiped off the bottom face of the fabric web. Examples of base-reactive (or acidic) materials are certain metals such as aluminum, tin and zinc and polymers such as acetals, polyesters, polycarbonates and silicones, and phenolic and ureaformaldehyde resins.

Non-base-reactive materials which I have found no be suitable as the surface of the supporting member include various polymers; polyethylene, polypropylene, polystyrene, fluorocarbon polymers ("Teflons") such as polytetrafluoroethylene and perfluoro (ethylene/propylene copolymers), methyl methacrylate polymer ("Plexiglas"), various nylon resins such as nylon 612 or a "Nylotron GX" sheet, polyphenylene oxide, polyphenylene sulfide and polysulfones. These are by way of example and are not intended to be exclusive of other non-base reactive polymers. Because of the very large number of polymers that have been developed and are continuing to be developed, and with many different properties being imparted by copolymerization, chemical group substitution, different degrees of polymerization, and the like, it is not possible to specify all of the non-base-reactive polymers. One skilled in the art will be able to select a non-base-reactive material that would be most suitable, functionally and economically, for the intended panel production process. The supporting member can be entirely non-base-reactive material or only the surface of the plate or roller can be of a non-base-reactive material.

A polymer which in one form may function properly as a non-base-reactive surface may fail if used in a modified form or may fail due to the operating environment. An example is a rigid polyvinylchloride plate which can become base-reactive due to the tendency of PVC to dehalogenate under certain conditions resulting in an acidic surface.

Good smoothness of the surface of the supporting member is a factor. Normally the surface of the supporting member, such as a new polypropylene plate, nylon plate or stainless steel roller will be smooth as installed. Wear of the plate or roller surface due to the abrasiveness of the portland cement particles in the slurry and of any aggregate added to the slurry, as well as of the sliding action of the web of fiber-glass mesh, can cause the plate or roller surface to become roughened. When wear occurs even a non-base-reactive surface will not function properly and will tend to drag the slurry off the face of the web of mesh. For example, I have found that a methyl methacrylate plate ("Plexiglas" from Rohm and Haas) will function properly for several days until the surface becomes roughened by wear. It then tends to exert a dragging action, wiping the slurry off of the mesh surface in some longitudinal areas and eventually across the width of the mesh. Consequently the supporting member will need to be removed and replaced with a new plate or a re-surfaced plate.

For long, continuous operation of the panel production machine good abrasion resistance of the plate or roller surface is needed so as to retain a relatively smooth, non-dragging surface. Thus, while the plate or roller that is employed has a non-base-reactive surface, if it is not wear resistant the plate or roller will need to be replaced frequently with resulting interruption of the machine. I have found that the filled polymers such as filled epoxies and composites such as the polypropylene/fiber-glass sheet sold by Azdel, Inc., Shelby, NC, under the name "Azdel" function reasonably well as wear resistant non-base-reactive surfaces. An "Azdel" plate can be used for as long as two weeks before the surface becomes so abraded that it will need to be replaced. Furthermore, I have found that stainless steels provide not only a non-base-reactive surface but also good abrasion resistance and permit longer running time. Stainless steels such as SS 304 and SS 316L work well, providing a surface life substantially in excess of two weeks. The chromium used in the stainless steels lends passivity to provide a strong non-base-reactive surface. A chromium plated steel plate or roller also provides a very good non-base-reactive abrasion resistant surface as the supporting member. The surface of the stainless steel or chromium plated member should be ground and/or polished to provide a smooth and true face. Although various carbon steels behave as non-base-reactive materials the abrasion resistance may not be adequate.

The choice of non-base-reactive material thus depends upon the use to be made and the operating conditions and economics. Thus, if it is practical to change the plate or roller frequently, then the "Azdel" polypropylene composite plate can be employed. The "Teflon" polymers afford good alkali resistance (non-base-reactive) but are not abrasion resistant. While the UHMW polyolefins are not only non-base-reactive but also abrasion resistant, a plate of the material is difficult to hold in a true plane. Certain rubberized coatings or elastomeric coatings which provide a non-base-reactive surface having desirable abrasion resistance can be used if bonded to a substrate.

Where a doctor is employed, for best results, the surface of the doctor also should be of a non-base-reactive material, such as a polymeric material, to minimize clinging of the slurry to the doctor, thus reducing any tendency of the doctor to wipe bare the top surface of the web. It is necessary that the working edge of the doctor and the face of the supporting member be matched to provide a uniform slot.

My invention includes means for producing fabric reinforced cementitious panels having fabric-wrapped longitudinal edges and in particular it includes means for producing such panels with the fabric on the edges being substantially open and free of slurry or the like. Such panels, having open fabric along the longitudinal edges, offer the advantage of improved edge-to-edge bonding of the panels when they are installed abutting each other as in the construction of a wall.

In order to produce such wrapped-edge cementitious panels the first web of reinforcing fabric (which forms the bottom layer of the panel) is wider than the panel width; the center section of the web receives the core layer and a margin section of the web on each side of the center is folded over to wrap each of the two edges of the core layer and also to extend over on to the top face of the core layer. The slurry is applied only in the longitudinally extending center section of this web where it is to be bonded to the bottom face of the core layer to cover the top surface and to overlay the margin strips of the bottom web that have been folded over the edges. Bonding material such as a portland cement slurry is applied to the second web either before or after it is laid down on the core layer.

DETAILED DESCRIPTION OF THE PREFERRED EMBODIMENT

Figure 1:
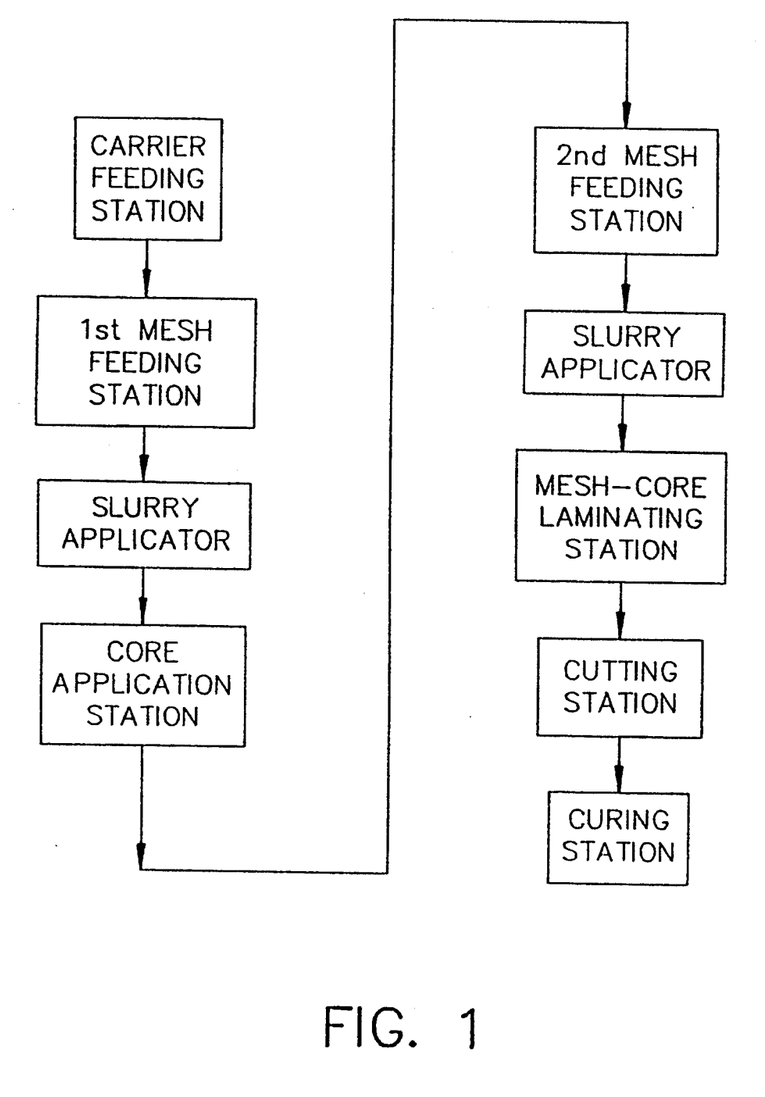
FIG. 1 is a diagram of the sequence of steps employed in producing fabric-reinforced cementitious panels.

FIG. 1 illustrates, diagrammatically, a conventional process for producing fabric-reinforced cementitious panels. In the process described in U.S. Pat. No. Re 32,038 to T. E. Clear et al, the panels are formed on abutting carrier sheets on a moving conveyor belt. Methods and apparatus for forming such panels on a web of plastic coated paper deposited on a conveyor belt are disclosed in U.S. Pat. No. 4,298,413 to Teare, and in U.S. Pat. No. 4,450,022 to Galer.

Figure 2A:
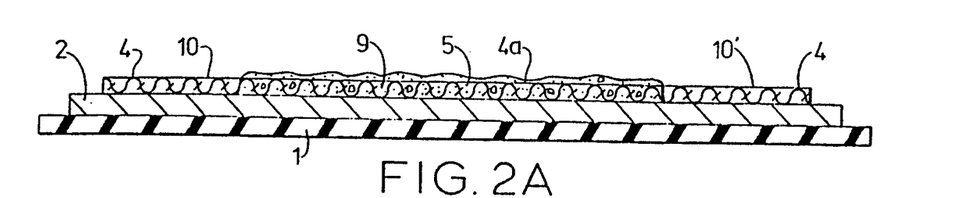
FIGS. 2A–2D illustrate, in cross-sectional views, the steps of placing the fabric web, in the formation of wrapped-edge cementitious panels having open-mesh edges.

FIGS. 2A–2D illustrate in cross-sectional views the sequence of steps in the folding of the fabric web to form a wrapped-edge, fabric-reinforced cementitious panel with the section of fabric on each of the longitudinal edges of the panel being open and unbonded. Numeral 2 indicates one of several abutting plastic carrier sheets supported on a moving conveyor belt 1. In FIG. 2A a web of woven fiber-glass mesh 4 (first mesh), coated in center section 9 with a portland cement slurry 5, is deposited on carrier sheet 2; the two margin sections 10 and 10' of the mesh are left unslurried. Numeral 4a indicates the slurried web.

Figure 2B:
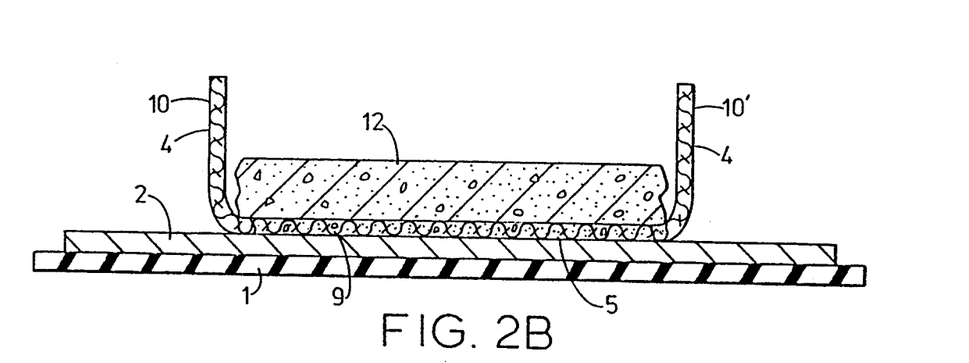

In FIG. 2B the two margin sections 10 and 10' are folded upward by suitable guides into a more or less vertical position after the core mix is deposited upon the slurried center section 9 and shaped to form the core layer 12. The bottom of core layer 12 becomes bonded to the center section 9 of mesh 4 by slurry 5.

Figure 2C:
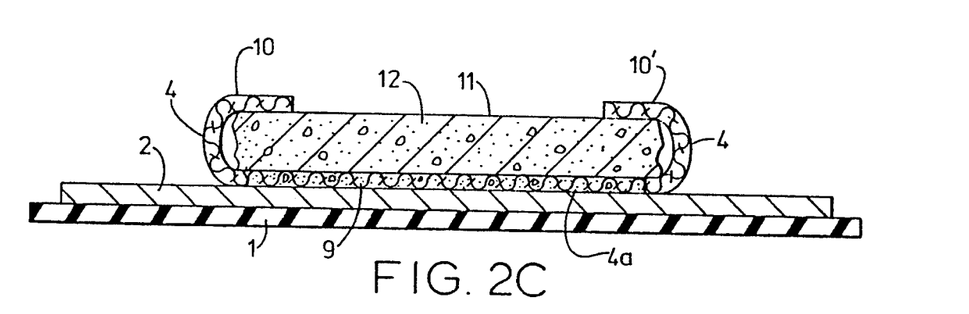

In FIG. 2C the margin sections 10 and 10' of mesh 4 are folded over onto the top face 11 of core layer 12.

Figure 2D:
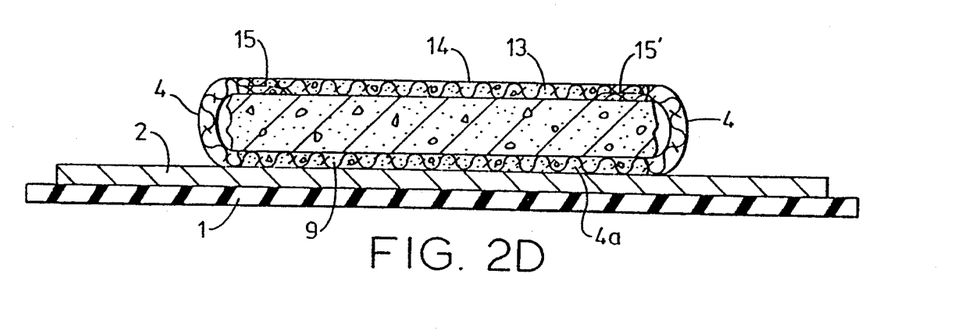

In FIG. 2D a second web of woven fiber-glass mesh 14 (second mesh), coated with a portland cement slurry 13 is laid on top face 11 of core layer 12, covering the portions of the margin sections 10 and 10' of mesh 4 which are folded over on the top face of the core layer. The top web 14 can be coated with slurry before or after it is laid down upon the core. The edges of the mesh 4 thus become bonded to the top face of the core layer 12 at 15 and 15' and to the web of mesh 14 by virtue of the slurry 13 applied to the mesh 14. A fabric-reinforced cementitious panel web (as a wet ribbon) suitable for cutting into individual panels is thus formed. The subsequent steps in the process, that of cutting the panel web into panel lengths, stacking and curing, are not shown as such are old in the art.

Figure 3:
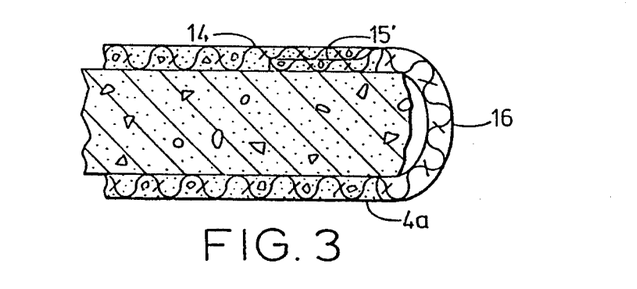
FIG. 3 is a partial cross-sectional view of a fabric-reinforced cementitious panel with an open-mesh wrapped edge.

FIG. 3 shows a partial cross-sectional view of a wrapped-edge fiber-reinforced cementitious panel as formed by the foregoing steps. Specifically, it shows the mesh on the wrapped edge of the panel as being open, numeral 16, that is, substantially free of slurry and core material, in a condition to receive the edge bonding material (mortar, etc.)

In order to provide the means for applying slurry to a selected section of the reinforcing fabric web I have developed a novel slurry applicator. One embodiment is described with reference to FIG. 4. It is described in this part of the specification as the applicator for the first mesh as discussed under FIG. 2A. The web of reinforcing fabric 4, as it is advanced, passes over supporting plate 3 and under doctor 6 (a blade, roller or bar) which spreads cementitious slurry 5 (in this example a portland slurry), fed from tube 5a, uniformly on the web, coating both faces thereof and filling substantially all of the openings in the mesh web. The slurried web 4a is then laid down on carrier sheets 2 moving on conveyor belt 1. The doctor 6 is adjustably spaced from the supporting plate 3 to permit control of the amount of slurry applied to the web 4. End dams 8, separately mounted but co-acting with doctor 6, confine the slurry.

Figure 4:
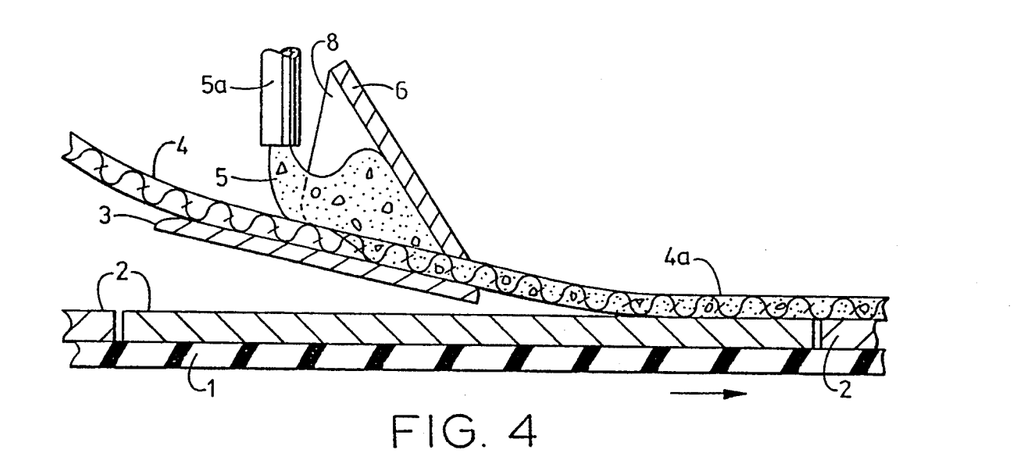
FIG. 4 is a side view of one embodiment of the slurry applicator having a support plate and a doctor.

As discussed elsewhere in the specification, the surface of the supporting plate must be a non-base-reactive material, for example, nylon, UHMW polyethylene or stainless steel. Preferably the entire plate is of a non-base-reactive material although it is sufficient that the surface of the plate is a non-base-reactive material. I have found that by using such a non-base-reactive supporting plate, the web can be fully coated on both surfaces with sufficient layer of slurry, on the bottom face, as well as the top face, in one simple operation. Furthermore, with this applicator, even with a 9×9 mesh which has relatively wide spacing of the yarns and therefore relatively large openings, virtually all of the mesh openings are filled. The result is that the mesh carries sufficient slurry for a substantially complete coverage of the face of the panel.

Figure 5:
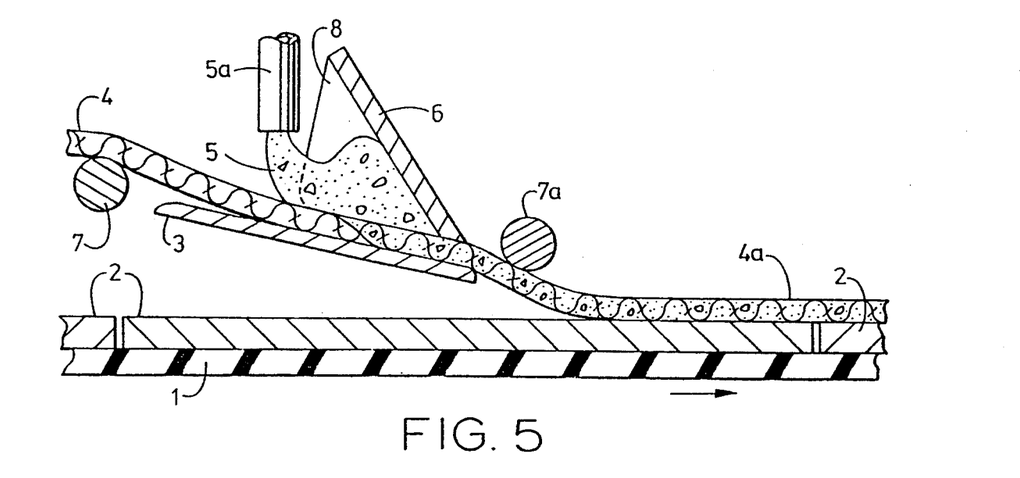
FIG. 5 is a side view of a modified slurry applicator with guides.

FIG. 5 shows a modification of the slurry applicator. Guide 7a serves to hold the mesh 4 down on supporting plate 3 with slight tension thereby eliminating wrinkles and puckers in the mesh. As a result a more uniform coating of the web is obtained as the web is held flat as it slides off of the plate. Guide 7 lifts the mesh 4 off of the plate slightly to facilitate penetration of the slurry through the mesh.

Figure 6:
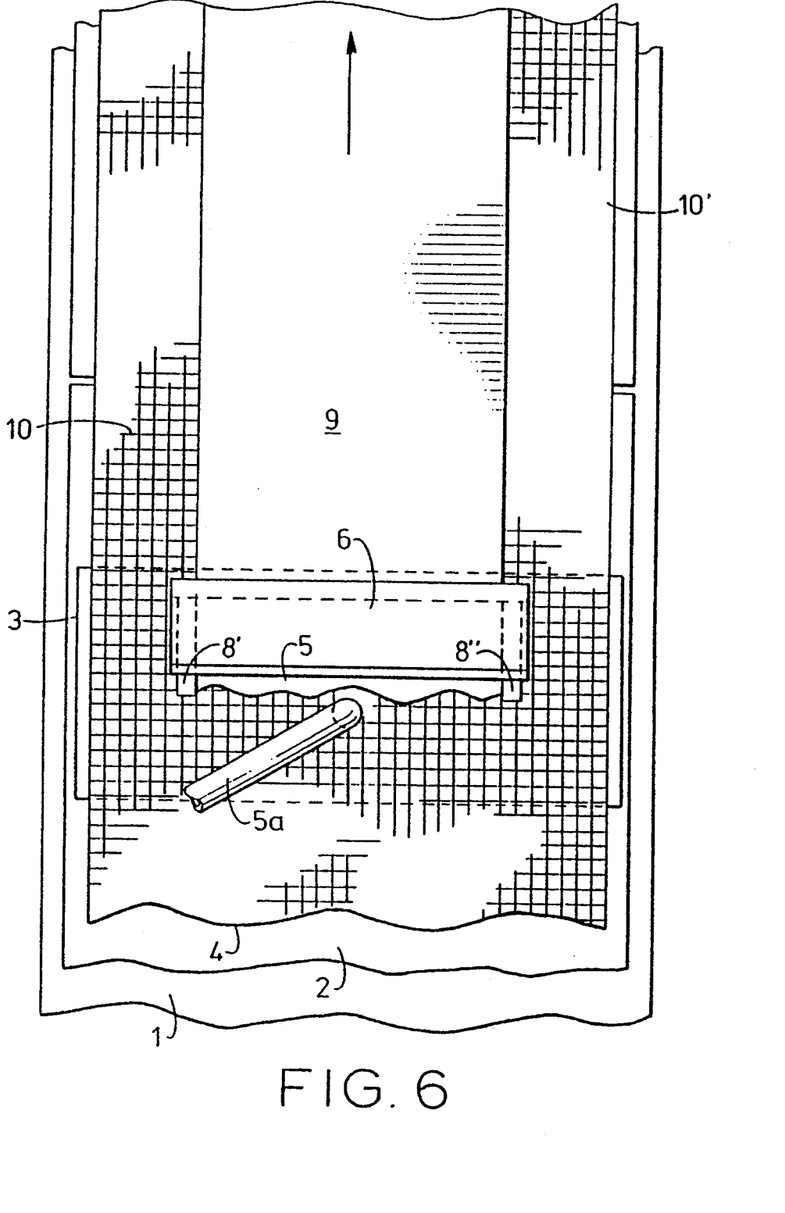
FIG. 6 is a top view of a web of reinforcing fabric at the slurry application station showing application of the slurry to a selected longitudinal section of the web.

In FIG. 6 the application of slurry to a selected longitudinal section of the web (in this example, the central section) is shown. A web of reinforcing fabric 4 is advanced over supporting plate 3 which is of a suitable length to span the width of the web 4. Doctor blade 6 is suitably mounted above plate 3 and adjustably spaced therefrom. Adjustable end-dams 8' and 8", independently mounted but in co-acting relationship with doctor 6, are spaced to the desired width 9 of application of slurry 5. The slurry 5 is fed to the doctor area by means of hose 5a. As the web leaves the slurry applicator, that is as it leaves doctor 6, the selected section 9 of the web will be properly coated with slurry 5, top and bottom faces and the openings in the mesh filled, while the margin sections 10 and 10' will be free of slurry, (i.e. for the open mesh edges).

Figure 7:
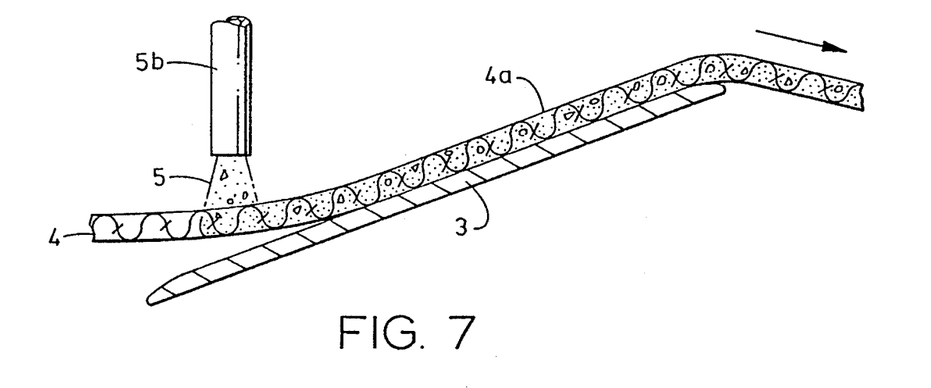
FIG. 7 is a side view of another embodiment of my slurry applicator having a support plate but which requires no doctor.

In another embodiment of my invention, the use of a doctor to spread the slurry uniformly over the mesh is eliminated. This slurry coater is shown in FIG. 7. The supporting member, plate 3, is inclined upward in the direction of travel of the mesh web 4. Slurry 5 is sprayed across the desired width of the web by spray nozzles 5b, in controlled amount to provide the desired coating of slurry on the mesh. Adjustable side darns (not shown) define the width of the longitudinal area of the mesh web being coated. The length of plate 3 and its angle of inclination are regulated to permit the slurry to level out before the mesh 4a leaves plate 3. The non-base-reactive nature of the surface of plate 3 makes this method feasible.

Figure 8:
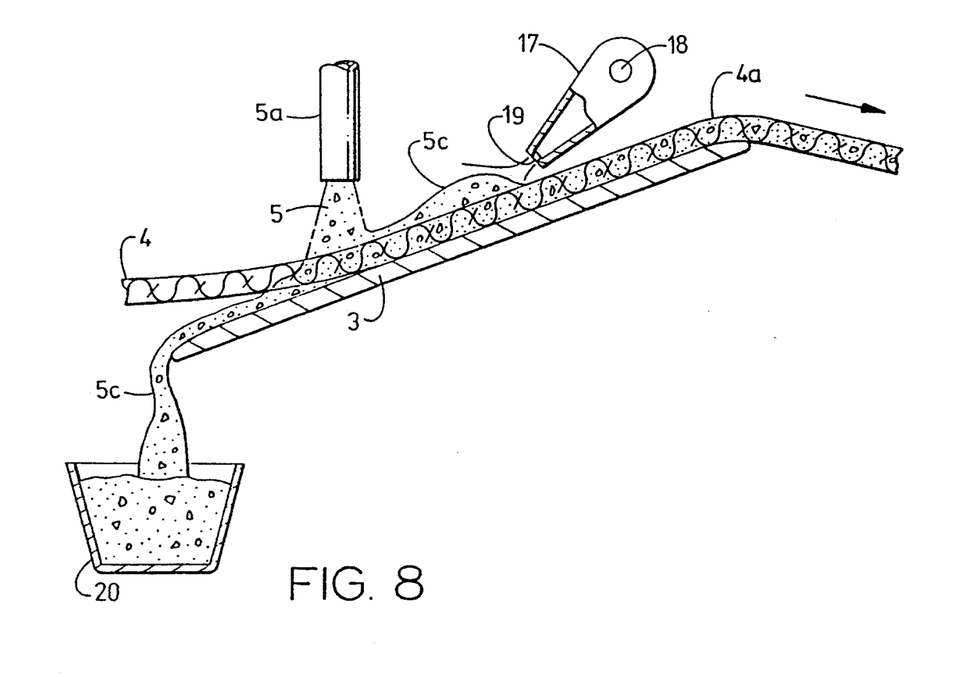
FIG. 8 is a side view of my slurry applicator which employs an air knife doctor.

In FIG. 8 an air knife, shown at 17 from air line 18. A thin blade of air emitted from nozzle 19 removes the excess slurry 5c leaving a uniform coating of slurry on the mesh. Adjustable side dams, not shown, control the width of the longitudinal area of the mesh that is being coated. Excess slurry 5c flows off the end of plate 3 and is caught in pan 20 for recycling. The amount of slurry retained on mesh at 4a is regulated by the air pressure and angle of incidence of the air knife.

Figure 9:
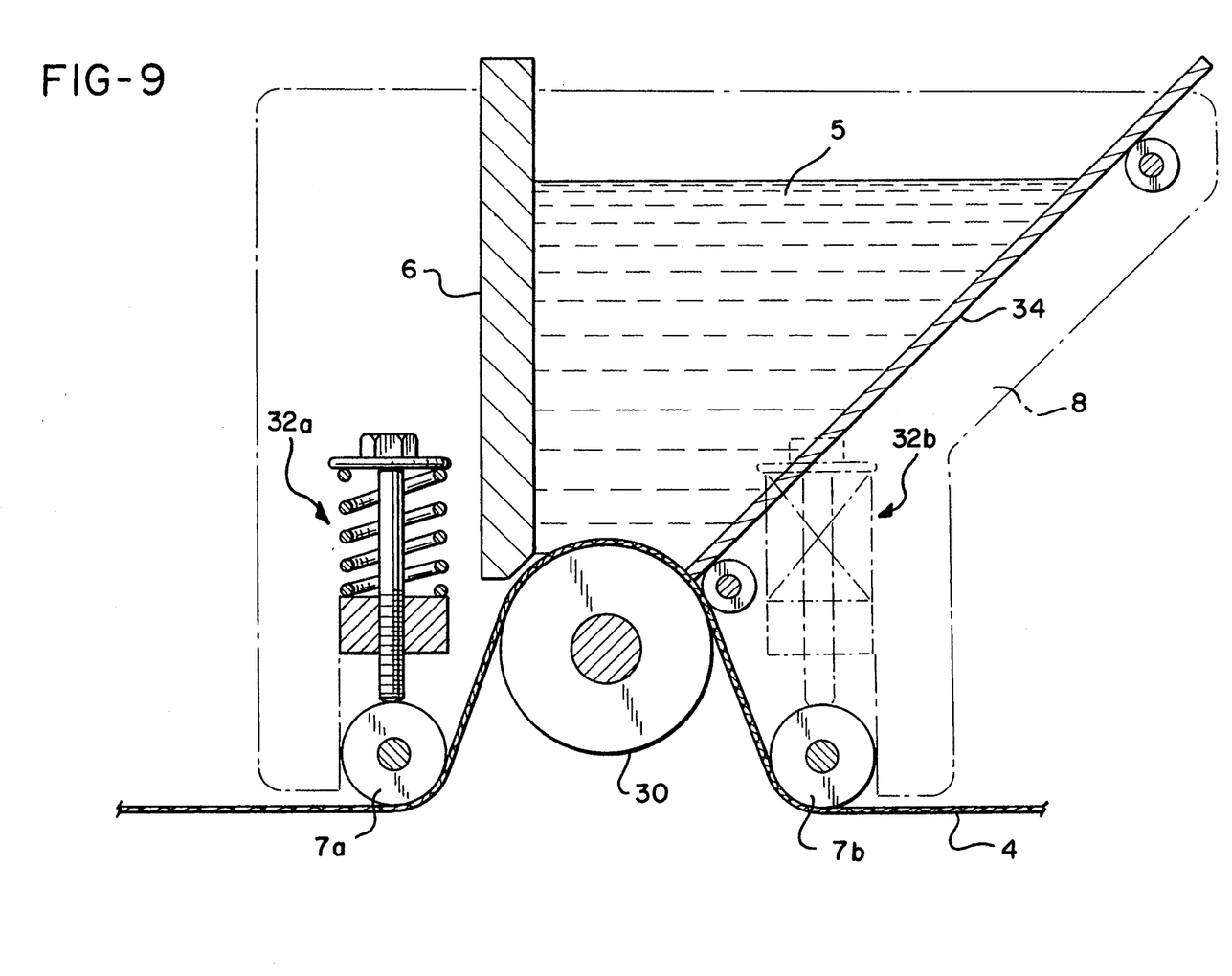
FIG. 9 is a side view of another embodiment of my slurry applicator having a support roller and a doctor.

Another embodiment of my invention is shown in FIG. 9. In this embodiment support roller 30 is used in place of a support plate as the supporting men%her. The mesh web 4 of reinforcing fabric, as it is advanced, passes over support roller 30 and under doctor 6, which in this instance is a doctor blade or coating metering bar. Guides 7a and 7b are spring loaded by springs 32a and 32b and hold the mesh web 4 taunt across support roller 30. As in the embodiment shown in FIG. 5, guide 7a also helps force the applied slurry through mesh web 4 and assure that both the lower and upper faces of mesh web 4 are coated with slurry and that the openings in the previous fabric are filled with the slurry. In this embodiment a plate 34 forms the back wall of the slurry applicator so that a puddle of slurry 5 is available above support roller 30. In this manner the slurry applicator of this embodiment performs like a nip coater in applying a uniform layer of slurry to the upper surface of mesh web 4. End dams 8 are used to confine the slurry and define the width of the longitudinal area of the mesh web being coated. By spacing the end dams to a width less than the width of mesh web 4, the margin sections will be free of slurry (i.e. for the open-mesh edges).

Thus, my slurry applicator, as shown in FIG. 4 or FIG. 5 or FIG. 9, is adapted to apply slurry to the full width of a web fabric, as well as to selected longitudinal sections, by use of a sufficiently long doctor and by suitable placement of the end-dams. The web of mesh 14 in FIG. 2D for example, can be coated with slurry across its full width.

Thus, my invention is also useful in producing wrapped-edge fabric reinforced panels of the type having cementitious bonding material covering and embedding the reinforcing fabric on all of the surfaces, that is on the top and bottom face of the core as well as along the longitudinal edges. Such panels are described in U.S. Pat. No. 4,916,004. The end-dams of my slurry applicator are set to the full width of the web (mesh) so as to apply the slurry or other cementitious material to the full width, and the mesh is then folded around the edges of the core layer in the manner shown in FIGS. 2A–2D. However, in this case the margin sections of the mesh folded around the core edges are slurry coated, embedding the mesh on the edges.

While I have described my invention with reference to the supporting member in the slurry applicator as being plate or roller my invention is not limited to such. The supporting member can also be a somewhat curved plate or arcuate surface or a non-rotating roll. A non-rotating roll having a non-base-reactive surface offers the advantage that at such time as a given axial area of its surface becomes worn the roll can be rotated a few degrees to present a non-worn surface area. This would reduce or eliminate the time required to replace the supporting member.

What is claimed is:

1. A method of producing a fabric reinforced cementitious panel web suitable for cutting into fabric reinforced cementitious panels having fabric-wrapped longitudinal edges with the fabric along said edges being open and substantially free of slurry, which comprises;

advancing a first web of pervious reinforcing fabric having an upper face, a lower face and openings therein over a first supporting member having a non-base-reactive surface with said lower face of said first web in contact with said non-base-reactive surface of said first supporting member, depositing cementitious slurry on said upper face of said first web as said first web is advanced across said first supporting member so that said slurry is confined to a longitudinal central section of said first web while leaving two longitudinal margin sections of said first web substantially free of slurry, said longitudinal central section being of panel width, spreading said slurry uniformly over said longitudinal central section of said first web in a controlled amount with a doctor means, assuring that both said upper face and said lower face of said longitudinal central section of said first web are coated with said slurry and that said openings therein are filled with said slurry, thereafter depositing said first web upon a carrier on a moving conveyor distinct from said first supporting member over which said first web has previously been advanced, depositing a core layer on said longitudinal central section of said first web as it is moving on said moving conveyor, folding each of said two longitudinal margin sections of said first web around a longitudinal edge of said core layer onto an upper face of said core layer, applying cementitious slurry to a second web of pervious reinforcing fabric having an upper face, a lower face and openings therein, so that both said upper face and said lower face of said second web are coated with said slurry and so that said openings therein are filled with said slurry, and depositing said second web on said upper face of said core layer to overlap and bond said folded over longitudinal margin sections of said first web to said upper face of said core layer, thereby forming a wrapped-edge fabric-reinforced cementitious panel web having longitudinal margin edges substantially open and free of slurry.

2. The method of claim 1 wherein said step of applying cementitious slurry to said second web comprises:

advancing said second web over a second supporting member having a non-base-reactive surface, with said lower face of said second web in contact with said non-base-reactive surface of said second supporting member, depositing said cementitious slurry on said upper face of said second web as it is advanced across said second supporting member, spreading said slurry uniformly over said second web in a controlled amount with a doctor means, and assuring that both said upper face and said lower face of said second web are coated with said slurry and that said openings therein are filled with said slurry.

3. The method of claim 2 wherein said first supporting member and said second supporting member are selected from the group consisting of a plate, a non-rotating roll, and a roller.

4. The method of claim 3 wherein at least one of said doctor means is a doctor blade.

5. The method of claim 4 wherein said step of assuring that both said upper face and said lower face of said longitudinal central section of said first web are coated with said slurry and that said openings therein are filled with said slurry is performed with a guide roll which contacts said upper face of said first web after said lower face of said first web is no longer in contact with said first supporting member.

6. The method of claim 5 wherein said step of assuring that both said upper face and said lower face of said second web are coated with said slurry and that said openings therein are filled with said slurry is performed with a guide roll which contacts said upper face of said second web after said lower face of said second web is no longer in contact with said second supporting member.

* * * * *